Jan. 30, 1962 L. H. TRAUTMAN 3,018,885
EXTRUSION AND STRETCH-STRAIGHTENING APPARATUS AND METHOD
Filed May 2, 1958
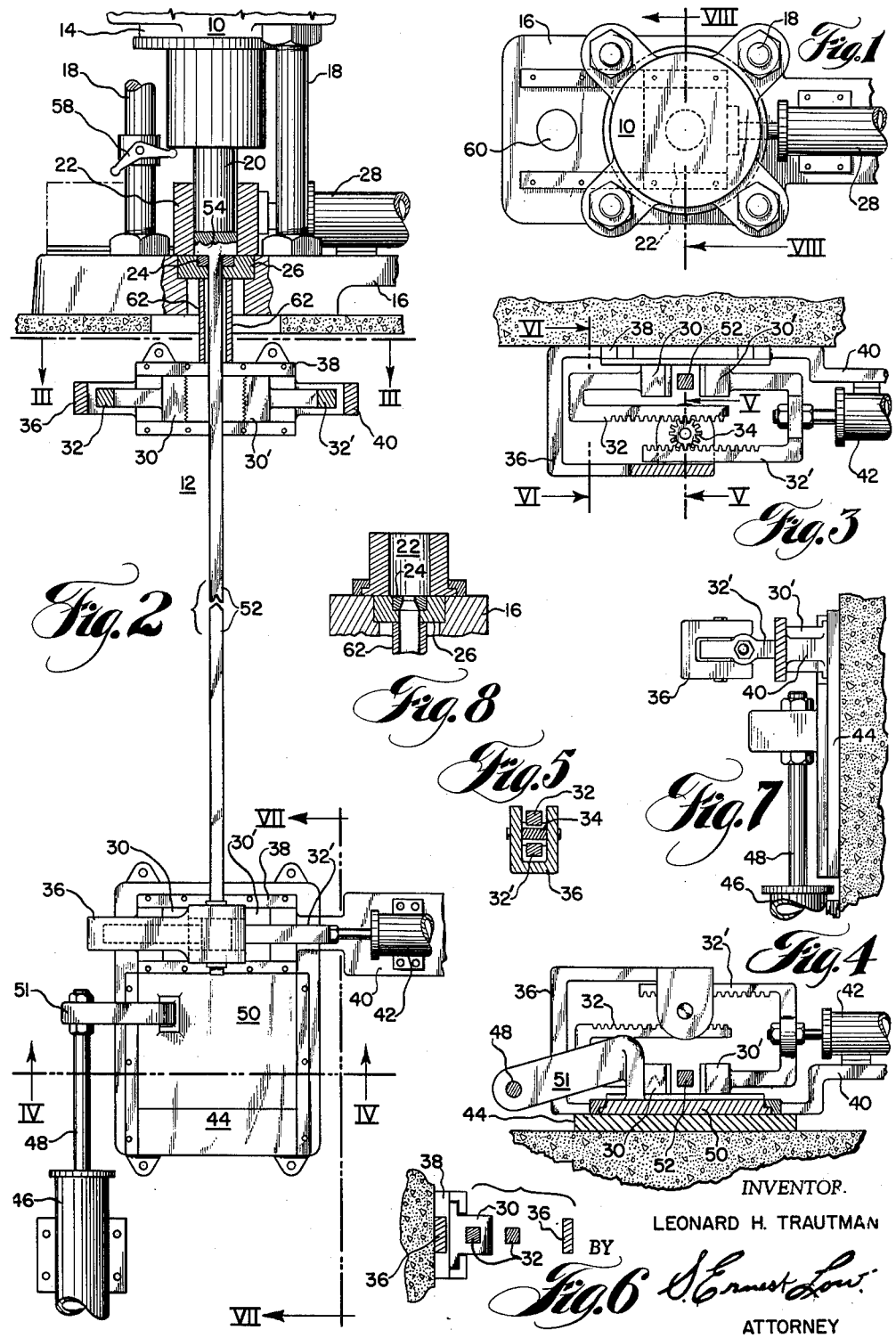
INVENTOR.
LEONARD H. TRAUTMAN
BY
S. Ernest Low
ATTORNEY

United States Patent Office 3,018,885
Patented Jan. 30, 1962

3,018,885
EXTRUSION AND STRETCH-STRAIGHTENING
APPARATUS AND METHOD
Leonard H. Trautman, Venetia, Pa., assignor to Aluminum Company of America, Pittsburgh, Pa., a corporation of Pennsylvania
Filed May 2, 1958, Ser. No. 732,666
3 Claims. (Cl. 207—1)

This invention relates to an integrated extrusion and stretching mechanism or plant, and method, for the production of axially straight extruded products. The invention is primarily addressed to extrusion apparatus and method for relatively high speed production of stretch-straightened commercially acceptable extruded sections.

Except in the case of impact extrusion, in which case the extruded member, such as a collapsible tube, is guided and interiorly supported over its relatively short extruded length by the male punch member producing the same, extruded products of indeterminate length must normally be stretch-straightened following their discharge from the extrusion press producing the same. Such stretch-straightening operations are usually performed at some station remote from the extrusion press employed for fabricating the initial extruded products and involves time and space consuming operations, as compared to the cycle of operation of the extrusion press in which the products were initially fabricated.

Attempts have been made to stretch-straighten extrusions, while the same were integral portions of the initial charge within the extrusion press container. It has also been suggested to provide extrusion stretching equipment adjacent an extrusion press in combination with conveyor and material handling means for translating extruded products laterally away from the normal extrusion axis of the press producing the same to some remote position for a stretch-straightening operation thereon.

All previous attempts to combine stretch-straightening within the normal elapsed cycle of operation of extrusion equipment has either resulted in lost operating time for the extrusion press, or has been productive of large quantities of scrap material in the form of cropped lengths of extruded products left in the press, but incapable of being grasped for stretch-straightening.

It is an object of the present invention to provide an integrated extrusion press and straightening mechanism so organized and coordinated that extrusions of indeterminate length may be stretch-straightened in the axial path of their discharge from the extrusion press producing the same.

Another object of the invention is to provide coordinated extrusion and stretch-straightening equipment which eliminate undue material handling devices and operations employed in existing extrusion and stretching equipment and techniques.

A further object is to provide methods and apparatus for producing axially straightened extrusions in the absence of undue amounts of extruded scrap material.

Other objects, features and advantages of the invention will be understood from the following description and illustrations of an embodiment of the invention, in which:

FIG. 1 represents a top plan view of an extrusion press illustrative of one form of equipment with which the invention may be practiced;

FIG. 2 is a view, in partial sectional elevation, showing the essential features of an extrusion press and coordinated stretch-straightening mechanism of the invention;

FIG. 3 represents a view of a portion of the stretch-straightening mechanism taken in the direction of the arrows III—III in FIG. 2;

FIG. 4 represents a view of a portion of the stretch-straightening mechanism taken in the direction of the arrows IV—IV in FIG. 2;

FIG. 5 is a sectional elevation taken on the plane V—V of FIG. 3;

FIG. 6 represents a sectional elevation taken on the plane VI—VI of FIG. 3;

FIG. 7 is a view of a portion of the strength-straightening mechanism taken in the direction of the arrows VII—VII in FIG. 2; and FIG. 8 represents a sectional elevation taken on the plane VIII—VIII of FIG. 1.

Basically and generally the apparatus and method of the invention includes the provision of an extrusion press having its axis of extrusion disposed in alignment with the operational axis of a stretching mechanism incorporating two pairs of axially spaced extrusion grasping jaws through and between which the extruded product is expressed by the press. On completion of an extrusion operation, and while the elongate extruded product is still an integral portion of the charge confined within the container of the press, the leading or fore end of the extruded product is grasped and securely held by the pair of jaws furthest removed from the press, in which condition the extrusion is sheared or otherwise separated from the unextruded material within the container as close thereto as the design and nature of the extrusion equipment will permit.

Immediately on completion of the aforementioned shearing or severing step, the grasped extrusion and jaws engaging the same are translated axially away from the press to permit grasping of the rear end of the extrusion by the second pair of jaws adjacent its sheared terminus. The extrusion thus rigidly grasped and secured adjacent its opposite ends is then stretch-straightened by axially separating the two pairs of axially aligned jaws in their engaged condition with the elongate extruded product.

In more specific terms, and on reference to the illustrations of an embodiment of apparatus suitable for practicing the invention, 10 illustrates an extrusion press, preferably of the vertical or tower type, supported for axial downward extrusion from an elevated position, or over a pit 12 below the plane of support of the press. Characteristic of tower or vertical extrusion presses, the press 10 includes a power cylinder 14 coupled to a main base or pedestal platen 16 by column tie bolts 18.

A pressure exerting ram 20, in cooperative assembly within the cylinder 14, is axially aligned with the bore of an open ended container 22 supported on an upwardly presented flat surface of the platen 16, the platen being provided with an aperture therethrough of stepped bore configuration for receiving and supporting a replaceable female extrusion die 24 and surrounding die supporting ring 26. The upwardly facing surfaces of the female extrusion die 24 and supporting die ring 26 are preferably flush with the upper flat surface of the platen 16 and serve as a flat shearing surface on reciprocation of the container 22 by means of a fluid operated piston and cylinder assembly 28 interconnected with the container 22, the purpose of which will be described hereinafter in more detail.

Immediately below the above-described tower extrusion press, and preferably disposed within the pit 12 below the surface on which the platen 16 is supported, is an extrusion stretching mechanism in axial alignment with the axis of the female die 24 and elongate extruded products discharged from the extrusion press.

The extrusion stretching mechanism includes axially separated pairs of extrusion grasping jaw members 30 and 30' preferably power actuated for lateral sliding adjustment into and out of clamping engagement on the exterior surface of an extruded product 52 centered between each pair of the jaws 30 and 30'. Each of the jaws 30 is provided with a unitary or integral rack bar 32 and each of the jaws 30' is provided with a unitary or integral rack bar 32', the rack bars 32 and 32' being mounted in positive engagement with a pinion 34 supported within the bifurcated ends of an offset bracket 36 preferably formed as an integral or unitary portion of each of the base plates 38 on which the aforesaid jaws 30 and 30' are slidingly mounted. A second offset bracket 40, also preferably formed integrally or unitarily with each of the base plates 38, serves as a mounting for power piston and cylinder assemblies 42 one each in positive connection with each of the racks 32', operation of the cylinder and piston assemblies 42 constituting a means for adjusting the jaws 30 and 30' in each pair of the same inwardly and outwardly in unison in respect to the extruded product 52 between said jaws. Both pairs of the axially separated jaws 30 and 30' are identical in their construction, as thus far described.

Whereas one pair of the previously described extrusion engaging and clamping jaws 30 and 30' is fixed in respect to the extrusion press 10, as by locating the same on the wall of the pit 12 immediately below the press platen 16, the second pair of extrusion engaging jaws 30 and 30' furthest removed from the press is axially spaced and axially slidingly mounted on a fixed base plate 44 located towards the bottom of the pit 12. A relatively fixed fluid operated cylinder and piston assembly 46 has its connecting rod 48 positively attached to a bracket 51 preferably formed integral with an extension 50 of the lowermost base plate 38 slidingly supporting the lower jaws 30 and 30'.

In the practice of the invention, billets or slugs to be extruded are charged singly into the container 22, the ram 20 being lowered into the container to extrude the material of a billet through the female extrusion die 24 to produce the elongate extruded product 52 depending downwardly from an unextruded portion 54 of the initially charged billet normally left in the container 22 as a discard. Downward movement of the ram 20 is interrupted on completion of a desired length of the extruded product 52, or when a definite predetermined thickness of discard 54 remains unextruded within the container 22. This discard or heel 54, in the case of a metal or metal alloy under extrusion, is normally predeterminable in thickness in terms of a contaminated mixture of metal and oxide desired to be excluded from the extrusion process. In order that the downward movement of the ram 20 may be positively controlled, a limit switch 58 may be provided to interrupt the power stroke of the ram 20 in any adjusted position of the same within its complementary container 22.

Interruption in the downward movement of the ram 20, signifying completion of an extrusion, is also employed through well-known electrical circuitry including the aforementioned limit switch 58, to condition and energize lowermost power operated cylinder and piston mechanism 42, in interconnected association with the pair of extrusion grasping jaws 30 and 30' adjacent the leading end of the extruded product 52, to clamp and hold the same, while at the same time initiating power piston and cylinder mechanism 28 to reciprocate the container 22 across the upper face of the platen 16 in the performance of a butt or heel shearing operation. In this latter operation, the container 22 is translated into registry with the aperture 60 in the platen 16, where the discard 54 can be ejected and the container recharged with a billet, or similar charge, for subsequent translation into axial alignment with the female die 24.

Translation of the container 22 to its broken line position illustrated in FIG. 2 is employed to energize and actuate power piston and cylinder mechanism 46 to translate the base plate 38 supporting the lower pair of extrusion grasping jaws 30 and 30', and its grasped and secured extrusion 52, axially downwardly to a location in which the severed upper end of the elongate extrusion 52 is received within the separated upper pair of extrusion grasping jaws 30 and 30', the severed end of the extrusion being guided within a tubular or equivalent guiding means 62 during its downward movement between the uppermost separated jaws 30 and 30'.

Downward axial movement of the lower jaws 30 and 30' is interrupted when the upper severed end of the extrusion 52 is disposed within the upper jaws 30 and 30', at which time the upper jaws 30 and 30' are closed through the medium of the power operated piston and cylinder mechanism 42 interconnected therewith to securely grasp and hold the extrusion at its upper severed end, which conditions and energizes the power cylinder and piston mechanism 46 to further advance the lower extrusion grasping jaws 30 and 30' and grasped extrusion in the performance of an axial stretch-straightening operation on the extruded member 52 securely held adjacent its ends between the upper and lower pairs of jaws 30 and 30'.

It will be observed from the foregoing description and practice of the method of the invention that elongate extruded products are fabricated and stretch-straightened without undue production of scrap in the form of lengths of extruded product extending between the discharge face of the female extrusion die 24 and upper location of jaws 30 and 30' as a result of the timed sequence of steps performed by the extrusion apparatus in its coordinated and integrated organization with a stretching mechanism located in axial alignment with the axis of extrusion of the extrusion mechanism. It is also to be observed that lost time in the operation of the extrusion press is reduced to a minimum, since the billet container 22 is rechargeable and returnable to extrusion position in axial alignment with the female extrusion die during the stretch-straightening step performed by axial separation of both pairs of the extrusion engaging jaws 30 and 30' and extrusion 52 secured therebetween.

It will be apparent to one skilled in the art that mechanism other than that specifically described hereinabove as one embodiment of equipment capable of practicing the invention, may be substituted therefor with equally good results.

It is not intended that the invention be limited to the precise description appearing hereinabove, except as defined in the appended claims, as follows.

I claim:

1. A stretch-straightening apparatus for an elongated work stock, such as an extruded product, comprising: a first pair of grasping jaws and a second pair of grasping jaws, said first pair of jaws being mounted so as to open and close about the axis said stock occupies during stretching and being mounted so as to be substantially immovable in directions parallel to said axis, said second pair of jaws being mounted so as to open and close about said axis and being mounted to slide along a surface parallel to said axis so that said second pair of jaws may occupy succeeding positions along said axis; means to selectively move the mounted said second pair of jaws in a direction toward said first pair of jaws and in the converse direction away from said first pair of jaws; four rack members each constrained to move in a straight course spaced from but transverse said axis, each jaw of each pair being unitarily and rigidly attached to a respective rack member of said members; two pinions affording a pinion for the two rack members of each pair of jaws, said pinion being mounted on an axis whose distance from said axis said stock occupies remains substantially constant in all positions assumed by said two rack members, the latter meshing with and moving together with the rotation of said pinion; means attached to one of said two rack members to move the same which through said pinion will then move the other of said two rack members and thus effect the opening and closing of the associated two jaws; whereby, after said stock is introduced between the opened two pairs of jaws, the latter is caused to close thus clamping and gripping said stock, and said means to selectively move is then moved in said converse direction thus elongating said stock whereafter the same is released and removed.

2. Apparatus for extruding stock and stretch-straightening the same, comprising: an extrusion press having a container adapted to receive a billet and provided with a pressure exerting ram for extruding less than the axial length of the billet through a female extrusion die associated therewith in axial alignment with the axes of the ram and billet container; an extrusion stretching mechanism in axial alignment with the axes of the ram, billet container and stock extruded through the female extrusion die, which mechanism comprises two pairs of axially separated stock grasping jaws, one pair of which jaws being axially fixedly located adjacent the discharge face of the extrusion press out of accessible interference therewith, and the other pair of jaws being remote therefrom and axially translatable in respect thereto, each pair of jaws being adapted for lateral sliding adjustment into and out of clamping engagement with the exterior surface of extruded stock axially disposed and guided thereby and therewithin during extrusion, means for axially adjusting and maintaining registry of the pair of jaws remote from the female extrusion die with the leading end of the extruded stock at completion of an extrusion stroke of the ram and thereafter laterally adjusting the last-mentioned pair of jaws into surface clamping relationship with the leading end of the extruded stock therewithin; and means for shearing the extruded stock adjacent the female extrusion die while its leading end is thus clamped, means for axially translating the leading end pair of jaws and clamped extruded stock while guiding the sheared end of the stock into axial registry with the pair of open jaws adjacent the discharge face of the extrusion press, means for laterally adjusting the open pair of jaws into closed surface clamping relationship adjacent the sheared end of the extruded stock, means for axially translating the leading end pair of jaws in surface clamping engagement with the extruded stock against the axial restraining engagement of the jaws in surface engagement with the sheared end of the stock thereby to stretch-straighten the stock, whereafter the stock is released from the two pairs of axially separated jaws and removed therefrom.

3. A method of extrusion and stretch-straightening elongate extruded stock, the steps comprising: extruding a billet less than the axial length thereof and guiding the stock axially through axially separated laterally open pairs of grasping jaws, grasping the leading end of the extruded stock at rest in a first pair of the jaw means, shearing the stock from the unextruded axial length of the billet while so grasped and at rest adjacent the female extrusion die producing the same, ejecting the unextruded length of billet and advancing the grasped leading end of the extruded stock and guiding the sheared end thereof through and into registry with the second pair of open jaws in axial registry therewith, interrupting axial movement of the extruded stock and clamping the second-mentioned pair of jaws in surface engagement adjacent the sheared end thereof, axially advancing the first pair of clamped jaws and leading end of the extruded stock against axial restraint of the second pair of jaws in engagement with the sheared end of the stock thereby to stretch-straighten the same, and thereafter releasing and removing the stock.

References Cited in the file of this patent

UNITED STATES PATENTS

| | | |
|---|---|---|
| 1,758,413 | Stiefel | May 13, 1930 |
| 2,155,131 | Hanlein | Apr. 18, 1939 |
| 2,176,365 | Skinner et al. | Oct. 17, 1939 |
| 2,352,442 | Loewy et al. | June 27, 1944 |
| 2,387,532 | Schenk | Oct. 23, 1945 |
| 2,487,972 | Katz | Nov. 15, 1949 |
| 2,608,892 | Bennert et al. | Sept. 2, 1952 |
| 2,715,431 | Grossu | Aug. 16, 1955 |
| 2,720,310 | Yack et al. | Oct. 11, 1955 |
| 2,858,017 | Kent et al. | Oct. 28, 1958 |
| 2,893,552 | Davies | July 7, 1959 |

FOREIGN PATENTS

| | | |
|---|---|---|
| 771,976 | Great Britain | Apr. 10, 1957 |
| 984,479 | France | Feb. 28, 1951 |